United States Patent [19]

Scholl et al.

[11] Patent Number: 5,143,961
[45] Date of Patent: Sep. 1, 1992

[54] HOT MELT ADHESIVE COMPRISING WATER SOLUBLE POLYALKYLOXAZOLINE AND WATER INSOLUBLE POLYMER

[75] Inventors: Steven L. Scholl, Cottage Grove; Eugene R. Simmons, Maplewood; Keith C. Knutson, Columbia Heights; William L. Bunnelle, Stillwater, all of Minn.

[73] Assignee: H. B. Fuller Licensing & Financing Inc., Wilmington, Del.

[21] Appl. No.: 455,917

[22] Filed: Dec. 21, 1989

Related U.S. Application Data

[63] Continuation of Ser. No. 67,706, Jun. 29, 1987, abandoned.

[51] Int. Cl.$^5$ .................... C08L 79/00; C08L 53/00; C08K 5/04
[52] U.S. Cl. .................... 524/317; 156/330.9; 524/221; 524/297; 524/308; 524/310; 524/312; 524/313; 524/320; 524/322; 524/502; 524/512; 524/612
[58] Field of Search ............... 524/221, 297, 308, 310, 524/312, 313, 320, 322, 505, 502

[56] References Cited

U.S. PATENT DOCUMENTS

| 4,699,941 | 10/1987 | Salerno | 524/308 |
| 4,743,238 | 5/1988 | Colon | 604/361 |

*Primary Examiner*—Christopher Henderson
*Attorney, Agent, or Firm*—Merchant, Gould, Smith, Edell, Welter & Schmidt

[57] ABSTRACT

Normally water insoluble hot melt adhesive compositions containing structural polymers such as A-B-A block copolymers, butyl rubbers, polyesters, ethylene vinyl acetates, ethylene acrylic acid polymers can be made sensitive to the action of water using an effective water sensitizing amount of a polyalkyloxazoline polymer in the hot melt adhesive. The polyalkyloxazoline polymer can be incorporated into a single phase adhesive composition with the structural polymer using an effective amount of a hydroxyl or carboxylic acid compound.

22 Claims, No Drawings

HOT MELT ADHESIVE COMPRISING WATER SOLUBLE POLYALKYLOXAZOLINE AND WATER INSOLUBLE POLYMER

This is a continuation of application Ser. No. 07/067,706, filed Jun. 29, 1987, now abandoned.

FIELD OF THE INVENTION

The invention relates to a hot melt adhesive that can be pressure sensitive and can have beneficial properties in the presence of water. These properties include alkali dispersibility, solubility, water activation, solubility with alkali, and others. The hot melt adhesives of this invention can provide strong bonds, cohesive strength in joining a variety of substrates while providing a variety of beneficial processing advantages.

BACKGROUND OF THE INVENTION

Hot melt adhesives are thermoplastic materials that can be used in solid or melt form substantially free of aqueous or organic solvents. Hot melt adhesives are typically applied to a substrate at elevated temperature. Upon contact with the substrates, the hot melt adhesives can cool, solidify and form a strong bond between joined surfaces. Hot melt adhesives can be pressure sensitive depending on formulation. In the past predominantly hot melt adhesives have been prepared from hydrophobic or water resistant polymeric compositions by blending the polymers with additives that enhance or produce useful properties in the hot melt. These conventional adhesives have satisfied many adhesive requirements in the market. However, the hydrophobic or water resistant nature of these adhesives have caused many drawbacks including the difficulty of recycling plastic, paper, metal or other substrates in aqueous recycling systems. Accordingly a substantial need exists for developing hot melt adhesive formulations that can be made to exhibit beneficial properties in the presence of aqueous and/or alkali systems.

BRIEF DESCRIPTION OF THE INVENTION

The invention resides in a hot melt adhesive comprising a thermoplastic typically water insoluble polymer, a polyalkyloxazoline polymer, a diluent agent selected from the group consisting of a hydroxyl compound having a hydroxyl number of greater than 150 or a carboxylic acid compound having an acid number of greater than 75 in combination with other optional adhesive compositions. A first aspect of the invention resides in a hot melt adhesive composition. A second aspect of the invention resides in a hot melt pressure sensitive adhesive composition. A third aspect of the invention resides in a hot melt adhesive insoluble in the presence of water but soluble in the presence of mild alkali. A fourth aspect of the invention resides in an article of commerce bearing an effective portion of an adhesive of the invention, such as a PET bottle, an envelope, a sealed paper roll wrap, and others.

DETAILED DISCUSSION OF THE INVENTION

The hot melt adhesive of the invention comprises a thermoplastic polymer, a polyalkyloxazoline polymer, hydroxy compound having a hydroxyl number greater than 150, and/or a carboxylic acid compound having an acid number of greater than 75. The adhesive can also optionally contain tackifiers, antioxidants, plasticizers, extending diluents, perfumes, dyes, and other functional compositions.

Thermoplastic polymers that can be used in the invention include polymeric compositions having a glass transition temperature of about $-90°$ to $100°$ C., a Melt Index of about $1°$ to $125°$ C., a molecular weight of about 10,000 to 200,000 Broad classes of useful thermoplastic polymers include vinyl polymers, polyesters, polyamides, polyimides, polyamideimide, polyethers, block polyamides-polyethers, block polyesters-polyethers, polycarbonates, polysulfones, polybis-imidazole, polybis-oxazole, polybisthiazole, and polyphenyl polymers.

Preferred classes of polymers for use with the adhesives of the invention include vinyl polymers including polyethylene, polypropylene, rubbery polymers and copolymers prepared from monomers including ethylene, propylene, styrene, acrylonitrile, butadiene, isoprene, and others, acrylic acid, methacrylic acid, methylacrylate, methylmethacrylate, vinyl acetate, hydroxy methylacrylate, hydroxy ethylmethacrylate, and other well known vinyl monomers.

Another preferred class of polymers for use in the adhesives of the invention include thermoplastic polyesters made from a di- or tricarboxylic acid in combination with a di- or trihydroxy compound.

Another preferred class of polymers include urethane copolymers made from polyfunctional isocyanate compounds in combination with a reactive compound such as an amine, an acid, or a hydroxyl compound.

A preferred class of polymers for use in the invention comprise rubbery block copolymers derived from monomers including styrene, acrylonitrile, butylene, isobutylene, isoprene, and others. Such polymeric and copolymeric compositions include butyl rubber, acrylonitrile-butadiene-styrene polymers, styrene-isoprene-styrene block copolymers, styrene-butadiene-styrene block copolymers, styrene-ethylene-butadiene-styrene block copolymers, and others. Another particularly preferred class of monomers include the acrylic class made from monomers such as acrylic acid, methacrylic acid, methylacrylate, methylmethacrylate, hydroxyalkyl acrylate and hydroxyalkyl methacrylate which can be formed in combination with other vinyl monomers including ethylene, styrene, propylene, vinyl chloride and others. The molecular weight and crosslinking extent of these polymers are selected such that the polymer can be easily handled in a molten form with handleable viscosities in common hot melt adhesive formulating equipment.

The polyalkyleneimines which can be used in the adhesives of this invention are commonly prepared by the polymerization of heterocyclic monomers of the general formula I:

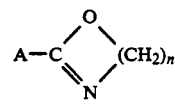

wherein A is a $C_{1-15}$ alkyl and n is 100–10,000. The polymers and polymerization techniques are in general as disclosed in U.S. Pat. Nos. 3,483,151 and 3,293,245, the disclosures of which are incorporated by reference herein.

Preferred polyalkyleneimines include polyethyleneimines and polypropyleneimines which are prepared by polymerizing heterocyclic monomers of the formula I wherein n is 2 or 3. These polyalkyleneimines can be represented by the general formula II:

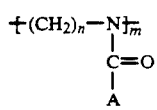

wherein A is as defined hereinabove, n is about 2-3 and m is about 50-100,000, preferably 100-7,500.

The molecular weights of the polymers derived from such monomers can range from less than 50,000 to 500,000 or above. The polymers are available in low (less than about 100,000), moderate (about 100,000 to 300,000) and high (greater than about 300,000) molecular weights. A molecular weight is selected generally to obtain a desired final viscosity. These polymers are soluble in water and many polar organic solvents, but can be advantageously insoluble in non-polar organic solvents. The polymers are thermally stable, low in solution viscosity, possess acceptable melt flow properties, and have low toxicity. The substituted polyalkyleneimine (polyoxazoline) polymers of this invention are available from the Dow Chemical Company.

The most preferred polyoxazoline polymers of this invention, for reasons of their low cost and high performance in adhesive applications, are polymers having the formula:

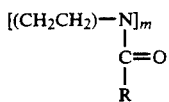

wherein m is as defined above and R is a $C_1$-$C_{12}$ alkyl such as methyl, ethyl, iso-propyl, t-butyl, cyclohexyl, cyclopentyl, methyl-cyclohexyl, dodecyl, and the like. Preferably, R will be an alkyl group having about 1-5 carbon atoms.

The hot melt adhesive compositions of this invention can contain a carboxylic acid functional compound having an acid number of at least 75. Both monomeric and polymeric acid functional compounds can be used. Monomeric compounds are typically small molecules having a molecular weight of less than about 1,000 having from 1 to 4 carboxylic acid groups. Examples of such carboxylic acid groups include $C_{6-24}$ fatty acids such as lauric acid, palmitic acid, oleic acid, stearic acid, linoleic acid, linolinic acid, aracadonic acid, and others. Other examples include the polyisobutylene and polypropylene substituted succinic acids, alkyl substituted benzoic acids, alkyl substituted phthalic acids, oxidized waxes, and others. Acid functional polymeric compounds could also be used in the adhesives of the invention. Such compositions include polymers having a molecular weight of about 500 and greater having an acid number of at least 75. Typical examples of such acid containing polymers include polymers containing repeating units of monomers such as acrylic acid, methacrylic acid, maleic anhydride, maleic acid, fumaric acid, vinyl benzoic acid, and other vinyl monomers containing at least one carboxylic acid functional group or carboxylic acid generating group such as an acid chloride or anhydride. Particular examples of such polymers include polyacrylic acid, polymethacrylic acid, ethylene acrylic acid copolymers, propylene methacrylic acid copolymers, styrene maleic anhydride copolymers, carboxylated vinyl acetate, carboxylated ethylene-styrene copolymers, carboxylated ethylene vinyl acetate copolymers, and others well known to the skilled chemist.

The hot melt adhesives of this invention can also contain a hydroxy substituted organic compound. The hydroxy substituted organic compound can be used to provide or enhance a number of properties of the composition. The hydroxy composition in combination with the other components of the invention can be used to form uniform homogeneous single phase compositions. Further, the hydroxy substituted organic compounds tend to produce adhesives with workable viscosity, controllable rate of set and heat resistance. If desired a sufficient quantity of a hydroxy substituted organic compound can substantially reduce or enhance pressure-sensitive properties of the adhesive. For example, liquid compounds tend to enhance PSA properties while solids tend to reduce PSA properties. The hydroxy compositions can be essentially aliphatic or aromatic, small molecule or polymeric. Many hydroxy substituted organic compounds exist including alcohols, hydroxy substituted waxes, polyalkylene oxide polymers and copolymers such as CARBOWAX® and many others. Preferred hydroxy substituted organic compounds include $C_{10-30}$ fatty acid alcohols, hydroxy substituted waxes, hydroxy substituted fatty acid mono-, di- and triglycerides, hydroxy substituted fatty acids, hydroxy substituted fats, hydroxy substituted fatty amides, diacetin, polyalkylene oxide polymers and copolymers made from polyethylene oxide, polypropylene oxide, and others. To ensure full compatibility, we have found that the hydroxyl number of the hydroxy substituted organic compound should be at least 150 and preferably between 200 and 500, and that at a level of more 20 wt % or more of a 150 hydroxyl number hydroxy wax an effective amount, 5 to 10 wt % of a $C_{8-20}$ fatty acid, preferably a $C_{8-20}$ saturated fatty acid can be used to ensure compatibility We believe that the acid can be omitted if the hydroxyl number of the hydroxyl compound is greater than 200.

Tackifying Agent or Resin

The polyoxazoline polymer itself can have insufficient pressure-sensitive properties for certain purposes. The addition of a compatible tackifying resin is commonly made to form a sufficiently adherent pressure-sensitive polymer blend.

Many tackifying agents such as resins or resin blends are well known in the art. Such resins include rosin acids, hydrogenated rosins, tall oil pitch heads (residue), ACINTOL or UNITOL® (Arizona Chemical), polyketones, polymerized mixed olefins, alkyl resins, phenolic resins, and terpene-phenolic resins. Especially preferred tackifying resins for use in the present compositions include the rosin acids (SYLVATAX®, RX Silvachem Company), and terpene-phenolic resins such as the NIREZ® series, e.g. NIREZ® V-2040, V-2150 (Reichhold Chemicals, Inc., Pensacola, Fla.), having a hydroxy number of at least about 150.

Suitable rosin acids, having the appropriate acid number, include the FORAL® AX acidic resin available from Hercules Inc. This resin is produced by hydrogenating wood rosin. Typical properties include a softening point of 75° C. by the Hercules drop method, a refractive index of 1.4960 at 100° C. and an abietic acid value of 0.15% (uv). The product typically has an acid number of about 150. Another preferred resin is the DYMEREX ® resin available from Hercules, Inc. This resin is composed predominantly of dimer acids derived from rosin, and includes lesser amounts of monomeric resin acids and neutral materials of rosin origin. Typical properties include a softening point of 150° C. by the Hercules drop method, a saponification number of 145, an average molecular weight of about 502, a density of about 1.069 kilograms per liter at 20° C., 8% unsaponifiable material, and an acid number of about 145. Another suitable tackifying resin is the STAYBELITE ® resin Hercules Inc.

Plasticizer

Plasticizers are generally classified as materials which can be incorporated into another material to increase its workability, flexibility, or distensibility. They can also enhance the tackifying effect of the tackifying resin. The addition of a plasticizer can lower melt viscosity, the temperature of the second order transition point or the elastic modulus of the treated material.

Commonly employed plasticizers include compounds of the following classes: adipic acid derivatives, azeleic acid derivatives, benzoic acid derivatives, diphenyl derivatives, citric acid derivatives, epoxides, glycolates, isophthalic acid derivatives, maleic acid derivatives, phosphorous acid derivatives, phthalic acid derivatives, polyesters, trimelitates, and the like. Castor oil, glyceryl trihydroxyoleate is available from a variety of chemical suppliers including CasChem, Inc. of New Jersey. CasChem provides this product as a variety of products having a Stokes viscosity of 7.5, specific gravity of 0.959, an iodine value of 86, a hydroxyl value of 164, a saponification value of 180, and a pour point of $-10°$ F.

Of the high acid plasticizers, especially suitable for use in the invention are a liquid hydroxylated fatty acid or a conjugated fatty acid, and isostearic acid. Isostearic acid is a commercially available material. One supplier is Emery Industries, Inc., of Cincinnati, Ohio. This product, sold under the mark EMERY 875-D, generally has an acid value of between 191.0 and 201.0, a free fatty acid value of 96-101%, a saponification value of 197-204, 3% unsaponifiable, an iodine value of no greater than 3, and a Titer of no greater than 9.0° C.

Other plasticizers can be selected from any of the commercially available benzoates, hydroxylated benzoates, or the acetates or benzoates of polyols, such as the acetates or benzoates of $C_2$-$C_6$ polyols comprising about 2-6 hydroxyl groups. Such plasticizers include acetin, glycerol tribenzoate (BENZOFLEX ® S-404), or pentaerythritol tetrabenzoate (BENZOFLEX ® S-552) or the mixed dibenzoates of dipropylene glycol and diethylene glycol (BENZOFLEX ® 50, Velsicol Corp., Chicago, Ill.). Another useful water insoluble plasticizer is butyl benzyl phthalate, available from Monsanto Co. as SANTICIZER ®160.

Water soluble plasticizers are preferred for use in adhesive compositions which are formulated so as to be water releasable. Useful plasticizers of this type include the liquid polyalkylene glycols, e.g. polyethylene glycols (PEG) of molecular weights of about 200-800.

Wax

The hot melt adhesive compositions can also contain a wax. This component can aid in viscosity control and can reduce the tendency of the adhesive to block under conditions of high temperature, pressure or high humidity. The wax preferably has an acid number between about 50 and 300 or a hydroxy number of at least about 160. If the wax is a high acid material, more preferably the acid number will be between about 75 and 275, more preferably between about 85 and 200, or most preferably, between about 120 and 170. Lower acid number waxes (acid No. 575 or OHNOB150) can be incompatible with the polyalkyleneimine, and high acid number waxes can result in an adhesive which corrodes hot melt equipment. We have found that Hoechst "S" wax, a montan acid wax, is particularly suitable for use in this invention, for reasons of compatibility, melt point, viscosity control and rate of set. It is available from American Hoechst Corporation of New Jersey. This material has a melting point of from 80°-83° C., a congealing point of 76°-79° C., an acid value of 140-155, and a saponification value of 160-180. We have found that a hydroxyamide wax (Paracin 220) with an OH No. of 300 can be used.

Copolymer

The formulation may contain an ethylene-acid copolymer, to provide additional strength and toughness and increase the resistance to cold. It will have the same acid number as specified previously in connection with the wax component. A particularly suitable ethylene-acid copolymer is the ELVAX ® II ethylene copolymer resin available from E. I. DuPont De Nemours & Co. This resin is an ethylene acrylic acid copolymer. The grade 5950 is especially suitable because of compatibility and toughness of the final adhesive. Typical properties of the ELVAX ® II 5950 resin include an acid number of 90, melt index (G/10min) of 25, tensile strength measured at ASTM D 638-82 of 3,820 p.s.i., elongation, measured at ASTM D 638-82 of 480%, elastic (tensile) print modulus, ASTM D 638-82 of 25,000 p.s.i., flexural modulus, ASTM D 79-81, Meth. 1, Proc. A of 14,000 p.s.i., density at 23° C. of 940 kg/m$^3$, durometer hardness, Shore A-2 of 94, and softening point, ring and ball, 138° C. Other suitable materials to provide the increased strength, toughness, and resistance to cold flow include temperature board failure.

Filler

The present adhesive formulations can also comprise an effective amount of an inorganic extender or filler, such as calcium carbonate, zinc oxide, alumina, clays, titanium dioxide, talc, carbon black, and the like. For example, the adhesives formulated to be moisture-sensitive and/or repulpable can comprise up to about 35 wt % of a mineral extender which is preferably fatty acid-ester coated to increase its organophilicity. One commercially available filler of this type is the stearate-calcium carbonate compound OMYACARB ® UF-T (Omya, Inc., Proctor, Vt.). Another commercially available filler is MINSPAR, a finely ground feldspar available from Indusman.

The hot melt adhesive compositions may also incorporate relatively small amounts of adjuvants such as UV absorbers, heat stabilizers, flavorings, release agents, additional antiblocking agents and antioxidants. Typical antioxidants include the IRGANOX ® series (Ciba-Geigy) and the distearyl pentaerythritol diphosphate (WESTON ®619, Borg-Warner Chemicals). When present, such adjuvants will commonly make up less than 5% by weight of the present adhesives.

Compatible polymers that can be included in the hot melt adhesive compositions of the invention include rubbery polymers and copolymers, acid functional polymers having an acid number of at least about 100, hydroxy (—OH) functional polymers having a hydroxyl number of about 150 or greater, nitrilo functional polymers including, for example, acrylonitrile, and other compatible polymers. Such polymers include styrene acrylic acid copolymers, ethylene acrylic acid copolymers, styrene alyl alcohol copolymers, ethylene vinyl alcohol copolymers, ethylene hydroxyethyl acrylate copolymers, ethylene hydroxyethyl methacrylate copolymers, ethylene hydroxy propyl acrylate copolymers, styrene-acrylonitrile copolymers, styrene-butadiene-acrylonitrile copolymers, impact modified styrene acrylonitrile rubbers, hydrogenated nitrile rubbers, nitrile rubber wherein the nitrile polymer contains about 60 to 20 wt % acrylonitrile; polyvinyl pyrrolidone, polyvinyl caprolactan, polyamides, made from piperazine or amine mixtures thereof; halogenated polymers, epichlorohydrin rubber, chlorinated polyolefin, vinyl chloride, vinyllidine chloride copolymers, and others.

Compositions of representative preferred adhesive formulations of the present invention are summarized in Table 1 below.

TABLE 1

| | Typical Adhesive Formulations | | | | | |
|---|---|---|---|---|---|---|
| | Water Resistant; Alkali Releasable Base Cup Hot Melt (Wt %) | | Thermally Stable Label Hot Melt (Wt %) | | Repulpable General Purpose Hot Melt (PSA Wt %) | |
| Ingredient | A | B** | A | B** | A | B** |
| Thermoplastic polymer | 5–75 | 10–30 | 5–75 | 5–60 | 5–75 | 20–50 |
| Polyalkyleneimine | 5–75 | 5–20 | 5–75 | 5–20 | 5–75 | 10–30 |
| Wax | 0–50 | 1–30 | 5–50 | 5–40 | 0–50 | 5–40 |
| Tackifying agent | 0–50 | 20–45 | 1–50 | 10–40 | 0–50 | 5–40 |
| Plasticizer | 0–50 | 0–30 | 0–50 | 0–20 | 0–50 | 0–40 |
| Filler | 0–25 | | 0–25 | | 0–25 | 5–25 |

**Preferred

Preparation

The hot melt adhesives of the present invention are prepared by combining the components in a hot melt condition by employing heating and mixing equipment typically employed in the formulation of compositions of the hot melt type. One preferred method involves combining the antioxidant if any, with all or a portion of the organic components, other than polyalkyleneimine polymer and hydroxy compound, and heating the mixture to a temperature at which it is a flowable liquid (200° to 350° F.). The stirred mixture is then treated with the polyalkyleneimine slowly until fully blended. the hydroxy organic compound, the acid functional compound, the tackifier, the plasticizer can then be added with the inorganic fillers, colorants, etc. The hot blend is mixed until homogeneous, can be filtered if needed, cooled and packaged.

The adhesives of this invention are applied to the substrates, e.g. cellulosics, fluorocarbon sheets, spun bonded polyester, polyester bottles, etc., in glue lines, in an extruded mass as thin films in a hot melt format. The adhesives of the invention can be used to make adherent articles by applying to at least one surface of a sheet-like material a thin film of the adhesive. Sheet-like material can be made of cellulosic materials, polymeric materials, fiberglass materials, composite graphite-polyamide fiber materials, etc. The adherent articles can be labels, tapes, structural members, etc.

Application of the adhesive to the sheet-like substrate may be by roller, dip plus doctor blade, printed dots, extrusion application wheels, or other similar, well-known apparatus.

The following examples further illustrate a variety of the adhesives that can be made within the scope of the invention and include a best mode.

EXAMPLE I

Into a heated Sigma blade mixer is placed 35 parts of a hydrogenated wood rosin (FORAL AX, Hercules Chemical). The mixer is heated to 350° F. and into the melt is placed ten parts of a polyethyloxazoline polymer having a molecular weight of 50,000. The mixer is operated until the melt is uniform and into the uniform melt is placed 20 parts of isostearic acid (EMERSOL 875, acid number between 187°–190°). When uniform, 25 parts of an ethylene acrylic acid copolymer (ELVAX 5950) having an acid number of 90 and melt index of 25 grams per ten minutes is added to the melt. The mixer is operated until the melt is uniform and into the melt is placed ten parts of a styrene-isoprene-styrene block copolymer (KRATON ®1117). The mixture is agitated until uniform. The wholly formulated adhesive has a 250° F. viscosity of 48,000 cPs and a 350° F. viscosity of 5100 cPs. At 40° a polyethylene terephthalate carbonated beverage bottle having a base cup adhered using the composition of this example at 40° F. maintained the base cup-bottle bond when dropped from a height of six feet onto a concrete surface with no adhesive failure. The adhesive was found to be insoluble in water at pH 7 but disposable at pH 12 at 1800.

EXAMPLE II

Into a heated Sigma blade mixer is placed 10 parts of a hydrogenated pure monomer resin with a 94° C. softening point (Regal REZ 1094) and 10.0 parts of a dimer wood rosin acid (DYMEREX resin). The contents of the mixer are agitated and heated to 200° F. until melted and into the melt is placed 20 parts of castor oil. The mixer is operated until the melt is uniform and into the uniform melt is placed 20 parts of a polyethylene acrylic acid copolymer having an acid number of 120. Into the compatible homogeneous melt is placed 5 parts of steric acid (EMERSOL 153 acid No. 196-199) and 1 part of an antioxidant. The mixer is operated until the melt is uniform and into the uniform melt is placed 14 parts of a polyethyloxazoline polymer having a molecular weight of 500,000 in small portions over a one-half hour period. Into the resulting uniform melt is placed 20 parts of a styrene-isoprene-styrene block copolymer (KRATON ®1107). The mixer is operated until the melt is uniform.

The formulated adhesive has a 275° F. viscosity of 24,000 cPs, a 350° F. viscosity of 5,000 cPs.

TABLE 2

|  | N1* | N2* | EXII | EXI |
|---|---|---|---|---|
| Staybelite Ester 10 | 56 | 46 | | |
| KRATON ® 1102 | 25 | 32 | | |
| Kaydol Oil | 19 | | | |
| Paraffin 155 | | 25 | | |
| Vis | | | | |
| 250° F. | 41,000 cps | 70,000 cps | 24,000 cps | 48,000 cps |
| 300° F. | 12,400 cps | 23,000 cps | 12,000 cps | 13,000 cps |
| 350° F. | 5,500 cps | 11,000 cps | 5,000 cps | 5,100 cps |
| 40° F. drop test | Pass | Fails | Pass | Pass |
| 110° F. torque IN/LBS | 128 avg | 95 avg | 95 avg | 65 avg |
| Alkali dispersible | No | No | Yes | Yes |
| Water soak Resistance | Excellent | Excellent | Adequate to Poor** | Excellent |

*U.S. Pat. No. 4,212,910, Taylor et al (National Starch and Chemical).
**Water sensitive loss of some bond strength, bond maintained.

EXAMPLE III

Into a heated Sigman blade mixer is placed 30 parts of a hydrogenated wood rosin (FORAL AX) and 15 parts of isostearic acid (EMERY 875). The mixture is agitated and the composition is heated to 200° F. until melted and into the uniform melt is placed 25 parts of an acid terminated polyamide polymer composition having a softening point of 275°–288° F. a molten viscosity at 375° F. of 1–200 cPs, a 400° F. viscosity of 7500 cPs, a specific gravity of 0.98 and an acid number of 7.1 (POLYAMID HL-6095, Terrell Corporation). The mixture is agitated until uniform and into the uniform melt is placed 30 parts of a polyethyloxazoline polymer having a molecular weight of 500,000. The adhesive composition has a 100 gram peel of 119° F. and a 500 gram shear of about 119° F. The composition has heat stability of at least 48 hours at 250° F. The composition exhibits good specific adhesints a variety of substrates and disposes in water and dilute alkali solution (ph about 12) 180° F.

EXAMPLE IV

Into a heated mixer container at 400° F. is placed 60 grams of isostearic acid (EMERSOL 875). Into the container is added an ethylene vinyl acetate copolymer (Vinathane-905, U.S. chemical; 50 mol percent vinyl acetate), slowly over a half an hour. The mixture is agitated until uniform and into the uniform melt is placed 60 grams of an ethylene acrylic acid copolymer having an acid number of 180 (AC-5180 Allied Chemical). The melt is agitated until homogeneous and into the melt is placed 90 grams of a polyethyloxazoline polymer having a molecular weight of 50,000. The melt is agitated until uniform and into the uniform melt is placed 15 grams of stearic acid. The composition exhibits good specific adhesion to a variety of substrates and disperses in water and dilute alkali solution (pH about 12) 180° F.

EXAMPLE V

Into a heated stirred container was placed 30 grams of castor wax, a triglyceride predominately of ricinoleic acid and 20 grams of wood rosin. The contents of the mixture are heated and stirred until a melt is formed. The contents of the container are mixed until uniform and into the melt is placed 40 grams of an ethylene acrylic acid inter polymer having an acid number of 120 (AC-5120 Allied Chemical). The contents of the container are mixed until uniform and into the container is placed 0.5 grams of an antioxidant (IRGANOX 1076) and 9.5 grams of a polyethyloxazoline polymer having a molecular weight of about 200,000. The contents of the container are mixed until uniform. The composition has a viscosity at 350° F. of 170 cPs. The composition was resistant to soaking in water but was readily dispersed in a dilute alkali solution at 140° F. The composition has excellent adhesion to difficult to bond surface, ie. plastic films, aluminum foil, grass, PET, etc., this composition is particularly useful for labeling recyclable containers.

COMPARATIVE EXAMPLE VA

Following the procedure of Example V, a hot melt adhesive was prepared containing the following ingredients: 8.0% process oil, 0.2% antioxidant, 8.0% of a styrene-ethylene-butylene-styrene copolymer (KRATON ® G 1652 Special), 41.8% tackifying resin (SILVATAC 295), 10% ethylene acrylic acid copolymer (AC-400), 15% paraffin wax (MP=155° F.), 7% process oil, 8% polyisobutylene molecular weight=300.

TABLE 3

| TYPICAL LABELING ADHESIVE COMPARATIVE PEEL AND SHEAR VALUES | | |
|---|---|---|
| | EXV-A | EXV |
| Programmed Oven Peel* | 102° F. | 113° F. |
| Programmed Oven Shear** | 138° F. | 149° F. |
| Water solubility | none | none |
| Alkali solubility | none | soluble |

*100 gm
**500 gm

EXAMPLE VI

Into a container at 400° F. is placed 60 grams of polyisobutylene having a molecular weight of about 1500 (INDOPOL-H 1500, Amoco Chemical Corporation). Into the heated melt is placed 45 grams of an ethylene vinyl acetate copolymer (ELVAX-40, DuPont Chemical Corporation). The contents of the container is mixed until homogeneous and into the melt is placed 45 grams of stearic acid (EMERSOL 153). The contents of the container are mixed until uniform and into the melt is added 90 grams of polyethyleneoxazoline polymer having a molecular weight of 50,000. The contents of the container are mixed until homogeneous and into the melt is added 60 grams of an ethylene acrylic acid copolymer having a acid number of 120 (AC-5120 Allied Chemical). The container is mixed until uniform. The adhesive is water resistant at room temperature, dissolves at 180° F. in water and dissolves at 160° F. in 0.05 normal sodium hydroxide. The composition is stable up to 14 hours at 350° F.

EXAMPLE VII

Into a heated container was placed 60 grams of a hydrogenated wood rosin which is heated and stirred to a temperature of 400° F. Into the melt was placed 75 grams of a vinyl acetate homopolymer (VINAC B-15, Air Products). The mixture was agitated until uniform and into the melt was placed 75 grams of an ethylene acrylic acid copolymer having an acid number of 180 (AC-5180, Allied Chemical). The mixture was agitated until uniform and into the melt was placed 90 grams of a polyethyloxazoline polymer having a molecular weight of 50,000. The composition was mixed at 375° F. until uniform.

EXAMPLE VIII

Into a heated container was placed 30.0 grams of castor oil, 34.5 grams FORAL AX, 0.25 grams IRGANOX 1076 and 0.25 Weston 619. The container contents were heated and mixed until a uniform melt was formed and into the melt was added 20 grams of a polyethyleneoxazoline polymer (MW 500,000). The contents were mixed until smooth. The melt was added 15 grams of a polyamide-polyethylene block copolymer having a Tg of −78° C., a melt index of 4.5 and a melt viscosity at 200° C. of 1200 Pa.s.

180° PEEL 4.4 lbs.

EXAMPLE IX

Example VII was repeated except the following ingredients were used:

| ingredients | (a) grams | (b) grams | (c) grams | (d) grams |
|---|---|---|---|---|
| Castor Oil | 25.0 | 30.0 | 25.0 | 30.0 |
| FORAL AX | 39.5 | 39.5 | 39.5 | 34.5 |
| IRGANOX 1076 | 0.25 | 0.25 | 0.25 | 0.25 |
| Weston 619 | 0.25 | 0.25 | 0.25 | 0.25 |
| PeOx 500 | 20.0 | 20.0 | 25.0 | 25.0 |
| PeBax | 15.00 | 10.00 | 10.00 | 10.00 |

| PHYSICAL TESTING | |
|---|---|
| Example | STATIC SHEAR (minutes) |
| VIII (b) | 227 |
| VIII (a) | 442 |
| VII | 112 |

| Example | 180° PEEL (lbs) |
|---|---|
| VIII (b) | 4.8 |
| VIII (a) | 5.95 |
| VII | 6.35 |

EXAMPLE X

Example IX(a) was repeated except that 15.0 grams of polyester-polyethylene block copolymer, with a melt under (g/10 min @190° C.) of about 5-7 a tg of 76° C. (Dyvax 722 DuPont, U.S. Pat. Nos. 3,832,314; 3,959,062; 3,932,062 and 4,048,128), was substituted for the 15 grams of the polyamide-polyester block copolymer.

| PHYSICAL TESTING | |
|---|---|
| Test | Result |
| 180° PEEL | 4.4 lbs. |
| STATIC SHEAR | 1979 minutes |

The above specification, examples and data provide a basic disclosure and explanation of the invention. However, since many embodiments and variations of the invention can be made without departing from the spirit and scope of the invention, the invention is embodied in the claims hereinafter appended.

We claim:

1. An aqueous alkali dispersible hot melt adhesive composition comprising:
   (a) about 10-30 wt % of a thermoplastic aqueous insoluble polymer having a molecular weight of about 10,000 to 200,000, a glass transition temperature of about −90° to 100° C. and a melt index of about 1 to 125 (g/10 minutes @190° C.) wherein said thermoplastic aqueous insoluble polymer is present in a concentration less than that necessary to form a nondispersible elastic;
   (b) about 1-75 wt % of an N-substituted polyalkyleneimine of the formula:

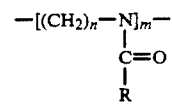

wherein n is about 2-3, m is about 100-10,000, and R is a $C_{1-3}$ alkyl group;
   (c) about 2-90 wt % of a functional diluent selected from the group consisting of an acid functional organic compound having an acid number of at least 75 and a hydroxy substituted organic compound having a hydroxyl number of 150 or greater; and
   (d) about 0-60 wt % of a compatible plasticizer or tackifier.

2. The adhesive of claim 1 wherein the thermoplastic polymer comprises a rubbery polymer.

3. The adhesive of claim 1 wherein the thermoplastic polymer comprises an acrylic polymer.

4. The adhesive of claim 1 when the thermoplastic polymer comprises a polyamide-polyether block copolymer.

5. The adhesive of claim 1 when the thermoplastic polymer comprises a polyether-polyester block copolymer.

6. The adhesive of claim 2 wherein the rubbery polymer comprises a polymer having repeating units derived from a monomer selected from the group consisting of ethylene, propylene, butylene, isoprene, chloroprene, styrene or mixtures thereof.

7. The adhesive of claim 4 wherein the rubbery copolymer comprises a block copolymer of the formula A-B-A wherein A is a styrene block and B is a polymer block made from monomers selected from the group consisting of ethylene, isoprene, butadiene and mixtures thereof.

8. The adhesive of claim 3 wherein the acrylic polymer is prepared from monomers selected from the group consisting of acrylic acid, methacrylic acid, methylacrylate, methylmethacrylate, hydroxyalkyl acrylate, hydroxyalkyl methacrylate, and mixtures thereof.

9. The adhesive of claim 8 wherein the acrylic polymer comprises an ethylene acrylic acid copolymer, an ethylene methacrylic acid copolymer, or mixtures thereof.

10. The adhesive of claim 1 wherein the N-substituted polyalkyleneimine comprises a polyalkyloxazoline polymer.

11. The adhesive of claim 10 wherein the molecular weight of the polyalkyloxazoline polymer is 50–500,000.

12. The adhesive of claim 10 wherein the polyalkyloxazoline polymer comprises a polyethyloxazoline polymer having a molecular weight selected from the group consisting of about 50,000, about 200,000, about 500,000, and mixtures thereof.

13. The adhesive of claim 1 wherein the acid functional organic compound is selected from the group consisting of a $C_{12-24}$ fatty acid, a dimer acid prepared from a $C_{12-24}$ unsaturated fatty acid, and mixtures thereof.

14. The adhesive of claim 1 wherein the acid functional organic compound comprises a polymeric composition having pendent carboxylic acid functionality.

15. The adhesive of claim 14 wherein the polymeric composition comprises a polymer containing repeating units derived from acrylic acid, methacrylic acid, maleic anhydride and mixtures thereof.

16. The adhesive of claim 14 wherein the polymer comprises an ethylene acrylic acid copolymer having an acid number of 75–300.

17. The adhesive of claim 1 wherein the hydroxy substitute organic compound comprises a hydroxy wax.

18. The adhesive of claim 1 wherein the hydroxy compound comprises a hydroxy stearic wax.

19. A water resistant, aqueous alkali-dispersible hot melt adhesive composition consisting essentially of:
(a) about 10–30 wt % of a thermoplastic rubbery block copolymer selected rom the group consisting of styrene-isoprene-styrene block copolymers, styrene-butadiene-styrene block copolymers, and styrene-ethylenebutylene-styrene block copolymers wherein said thermoplastic aqueous insoluble polymer is present in a concentration less than that necessary to form a nondispersible elastic;

(b) about 5–75 wt % of a polyalkyloxazoline polymer of the formula:

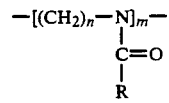

wherein n is about 2–3, m is about 100–10,000, and R is a $C_{1-3}$ alkyl group;
(c) about 2–90 wt % of a functional diluent selected from the group consisting of an acid functional organic compound having an acid number of at least 75, said acid functional organic compound selected from the group consisting of a $C_{12}$ fatty acid, a dimer acid prepared from a $C_{12-24}$ unsaturated fatty acid, a polymeric composition having a pendent carboxylic acid functionality, or mixtures thereof, and a hydroxy substituted organic compound having a hydroxyl number of at least 150, said hydroxy compound selected from the group consisting of a hydroxyl wax, a $C_{10-30}$ fatty acid alcohol, a hydroxy substituted glyceride, a hydroxy substituted fatty acid, a hydroxy substituted fat, a hydroxy substituted fatty amide, a polyalkylene oxide polymer or copolymer or combinations thereof; and
(d) about 0–60 wt % of a compatible plasticizer or tackifier.

20. The adhesive of claim 19 wherein the molecular weight of the polyalkyloxazoline polymer is 50–500,000.

21. The adhesive of claim 19 wherein the polymeric composition comprises a polymer containing repeating units derived from acrylic acid, methacrylic acid, maleic anhydride and mixtures thereof.

22. The adhesive of claim 21 wherein the polymer comprises an ethylene acrylic acid copolymer having an acid number of 75–300.

* * * * *